(12) United States Patent
Fujiki et al.

(10) Patent No.: US 10,896,612 B2
(45) Date of Patent: Jan. 19, 2021

(54) LANE CHANGE ASSISTANCE DEVICE AND LANE CHANGE ASSISTANCE METHOD

(71) Applicant: DENSO CORPORATION, Kariya (JP)

(72) Inventors: Koji Fujiki, Kariya (JP); Hiroaki Niino, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 247 days.

(21) Appl. No.: 16/069,386

(22) PCT Filed: Jan. 13, 2017

(86) PCT No.: PCT/JP2017/001057
§ 371 (c)(1),
(2) Date: Jul. 11, 2018

(87) PCT Pub. No.: WO2017/122791
PCT Pub. Date: Jul. 20, 2017

(65) Prior Publication Data
US 2019/0005823 A1   Jan. 3, 2019

(30) Foreign Application Priority Data
Jan. 14, 2016   (JP) ................ 2016-005160

(51) Int. Cl.
*G08G 1/16* (2006.01)
*B62D 6/00* (2006.01)
*B62D 15/02* (2006.01)

(52) U.S. Cl.
CPC ............ *G08G 1/167* (2013.01); *B62D 6/001* (2013.01); *B62D 6/003* (2013.01); *B62D 15/0255* (2013.01)

(58) Field of Classification Search
CPC .... B62D 15/0255; B62D 6/003; B62D 6/001; G08G 1/167
(Continued)

(56) References Cited

U.S. PATENT DOCUMENTS 6,092,619 A * 7/2000 Nishikawa ........... B62D 15/025
                                                                    180/204
2009/0005933 A1* 1/2009 Tabata ................ B60T 8/17557
                                                                    701/42
(Continued)

FOREIGN PATENT DOCUMENTS

JP       2008-094111 A     4/2008

*Primary Examiner* — Behrang Badii
*Assistant Examiner* — Hossam M Abd El Latif
(74) *Attorney, Agent, or Firm* — Maschoff Brennan

(57) ABSTRACT

Disclosed herein is a lane change assistance device, including: a change time setting unit configured to set a change time required for the lane change; a yaw angle acquisition unit configured to acquire a yaw angle of an own vehicle before starting the lane change; and a steering control unit configured to control a steering unit of the own vehicle to perform the lane change in the change time set by the change time setting unit, wherein when the yaw angle acquired by the yaw angle acquisition unit is a yaw angle in a state where the own vehicle approaches a target lane designated during the lane change, the change time setting unit sets the change time shorter than in other states, and when the yaw angle acquired by the yaw angle acquisition unit is a yaw angle in a state where the own vehicle stays away from the target lane, the change time setting unit sets the change time longer than in the other states.

9 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2010/0228420 A1* | 9/2010 | Lee | .................... | B62D 15/0255 |
| | | | | 701/26 |
| 2015/0161895 A1* | 6/2015 | You | ........................ | G08G 1/167 |
| | | | | 701/70 |
| 2015/0355641 A1* | 12/2015 | Choi | ...................... | G05D 1/021 |
| | | | | 701/23 |

* cited by examiner

LANE CHANGE ASSISTANCE DEVICE AND LANE CHANGE ASSISTANCE METHOD

CROSS-REFERENCE TO RELATED APPLICATION

This application claims priority to and the benefit of Japan Patent Application No. 2016-5160 filed at the Japan Patent Office on Jan. 14, 2016, the entire contents of which are incorporated herein by reference.

BACKGROUND

Technical Field

The present disclosure relates to a lane change assistance device and a lane change assistance method.

Background Art

In JP-A-2008-94111, disclosed herein is a lane change assistance device configured to assist a lane change of a vehicle. The lane change assistance device sets a vehicle travel trajectory so as to execute a lane change to a neighboring lane, and controls a steering unit based upon the vehicle travel trajectory. The lane change assistance device sets the vehicle travel trajectory in order for a change time required for the lane change to be constant.

CITATION LIST

Patent Literature

[Patent Document 1] JP-A-2008-94111

The above information disclosed in this Background section is only to enhance the understanding of the background of the disclosure and therefore it may contain information that does not form the prior art that is already known to a person of ordinary skill in the art.

A position in a lateral direction of a vehicle before starting a lane change may be deviated from a center of a lane. Further, a yaw angle of the vehicle before starting the lane change may not be 0°. In these cases, when a change time is constant, a steering angle during the lane change may be excessively large, or excessively small. In this case, a driver may have an unpleasant feeling.

SUMMARY

In consideration of the drawbacks described above, the present disclosure has been made in an effort to provide a lane change assistance device and a lane change assistance method that are capable of appropriately setting a change time required for a lane change, depending on a state before starting a lane change.

According to an exemplary embodiment of the present disclosure, a first lane change assistance device for assisting a lane change of an own vehicle, includes: a change time setting unit configured to set a change time required for the lane change; a yaw angle acquisition unit configured to acquire a yaw angle of an own vehicle before starting the lane change; and a steering control unit configured to control a steering unit of the own vehicle to perform the lane change in the change time set by the change time setting unit.

According to the change time setting unit in the first lane change assistance device, when the yaw angle acquired by the yaw angle acquisition unit is a yaw angle in a state where the own vehicle approaches a target lane (which is a new lane to which the running lane is to be changed) desired during the lane change, the change time setting unit may set the change time shorter than in other states, and when the yaw angle acquired by the yaw angle acquisition unit is a yaw angle in a state where the own vehicle stays away from the target lane, the change time setting unit may set the change time longer than in other states.

According to the first lane change assistance device, even when an yaw angle of a vehicle before starting the lane change is not 0°, it is advantageously possible not only to prevent a steering angle and a yaw rate during the lane change from being excessively large, or excessively small, but also to prevent a driver of an own vehicle from feeling discomfort.

According to another exemplary embodiment of the present disclosure, a second lane change assistance device for assisting a lane change of an own vehicle, includes: a change time setting unit configured to set a change time required for the lane change; a lateral position acquisition unit configured to acquire a position in a lateral direction of the own vehicle before starting the lane change; and a steering control unit configured to control a steering unit of the own vehicle to perform the lane change in the change time set by the change time setting unit.

According to the change time setting unit in the second lane change assistance device, when the position in the lateral direction acquired by the lateral position acquisition unit is closer to the target lane desired during the lane change than a reference position set in advance, the change time setting unit may set the change time shorter than in other states, and when the position in the lateral direction acquired by the lateral position acquisition unit is farther from the target than the reference position, the change time setting unit may set the change time longer in the than other states.

According to the second lane change assistance device, even when the position in the lateral direction of the own vehicle before starting the lane change is closer to or farther from the target lane than the reference position, it is advantageously possible not only to prevent a steering angle and a yaw rate during the lane change from being excessively large, or excessively small, but also to prevent the driver of the own vehicle from having the unpleasant feeling.

Further, it is to be understood that reference numbers used in the present specification represent a relationship with a concrete means according to the exemplary embodiment which will be described as one exemplary embodiment, and are not intended to limit the technology scope of the present invention.

BRIEF DESCRIPTION OF THE DRAWINGS

The above-mentioned object and other objects, characteristics, and advantages of present disclosure will be hereinafter described in detail with the accompanying drawings.

DESCRIPTION OF EMBODIMENTS

Hereinafter, exemplary embodiments of the present disclosure will now be described in detail with the accompanying drawings.

First Exemplary Embodiment

1. Configuration of Lane Change Assistance Device 1

A configuration of a lane change assistance device 1 will now be described with reference to FIGS. 1 and 2. The lane change assistance device 1 is an on-vehicle device, that is, the lane change assistance device 1 is mounted on a vehicle (refer to a vehicle 43 in FIG. 4). A vehicle on which the lane change assistance device 1 is mounted is hereinafter referred to as an own vehicle. The lane change assistance device 1 has a function of assisting a lane change of the own vehicle.

Figure 1:
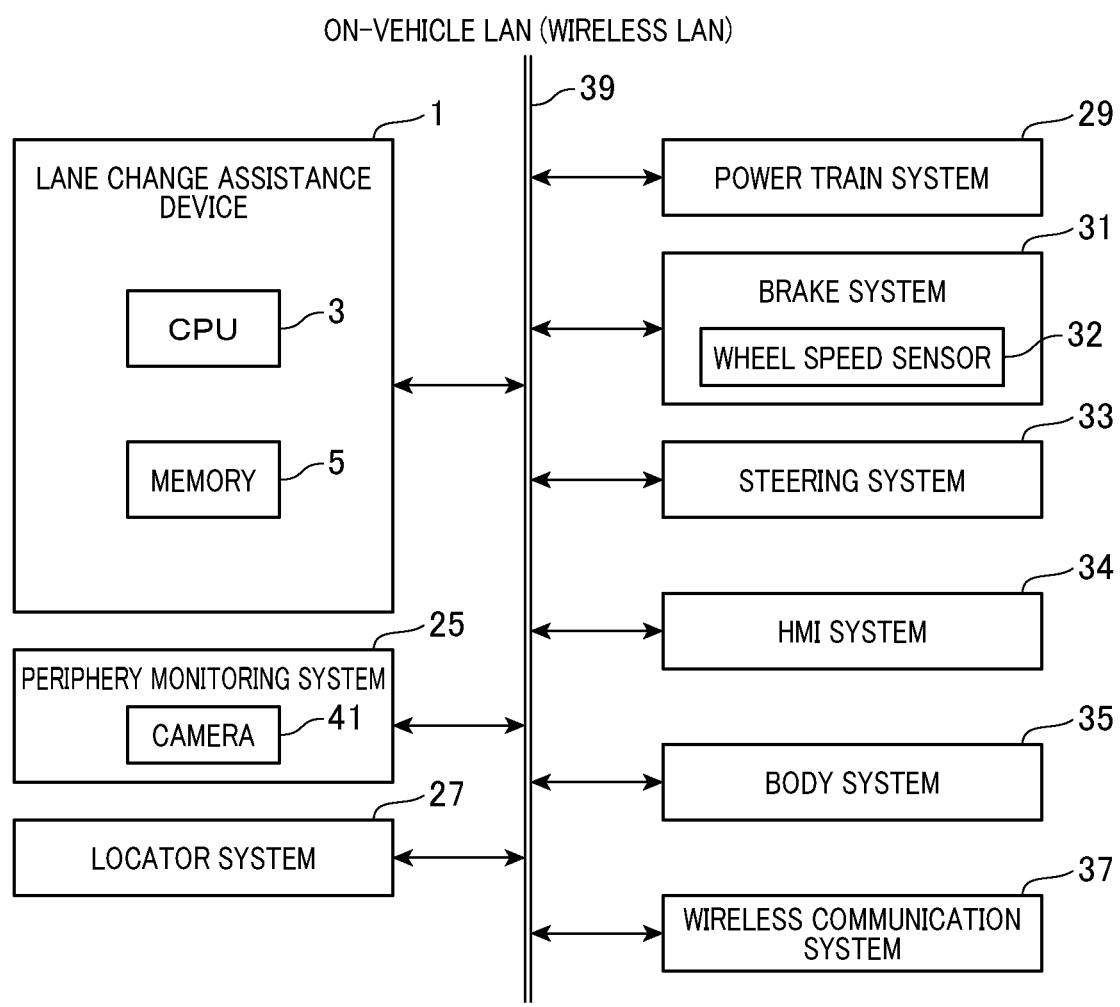
FIG. 1 is a block diagram illustrating a lane change assistance device 1 and a configuration related to the lane change assistance device 1.

As shown in FIG. 1, the lane change assistance device 1 is mainly configured with a well-known microcomputer that is provided with a CPU (Central Processing Unit) 3, a RAM (Random Access Memory), a ROM (Read Only Memory), a semiconductor memory (hereinafter referred to as a memory 5) such as a flash memory, and the like. Respective functions of the lane change assistance device 1 are accomplished in such a manner that the CPU 3 executes a program that is stored in a non-transitory computer readable recording medium. In this example, the memory 5 corresponds to the non-transitory computer readable recording medium in which the program is stored. A method corresponding to the program is executed by executing the program.

Further, the number of microcomputers, with which the lane change assistance device 1 is configured, may be one or more than one. The memory 5 includes computer-readable electronic media such as a DVD-ROM (Digital Versatile Disk Read Only Memory), a CD-ROM (Compact Disc Read Only Memory), a hard disk, and the like.

Figure 2:
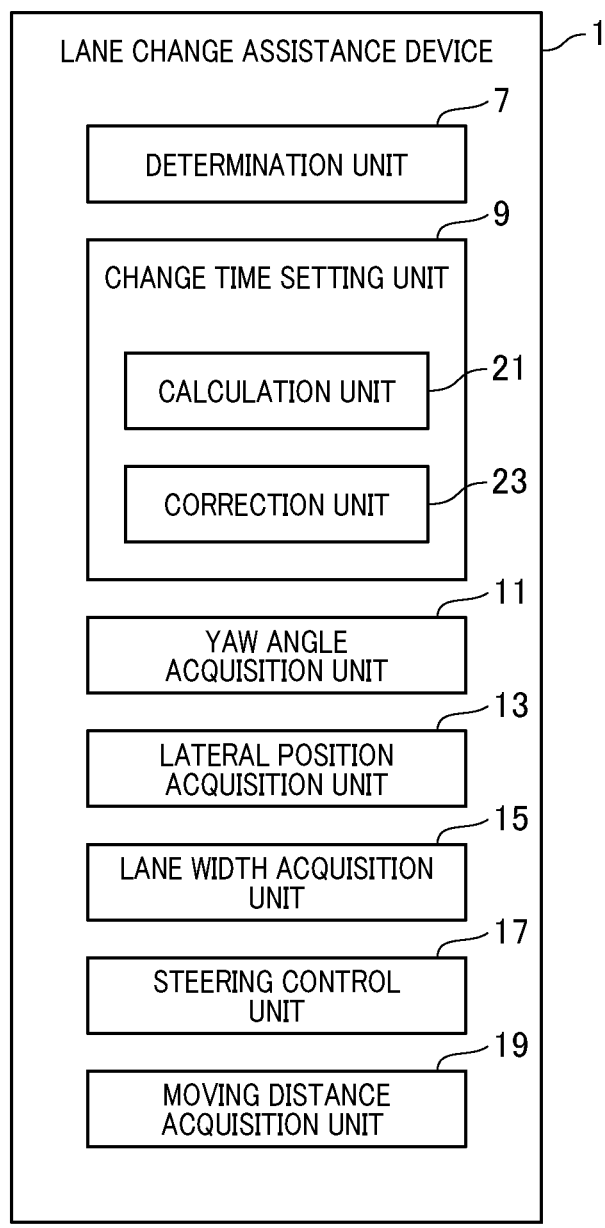
FIG. 2 is a block diagram illustrating a functional configuration of the lane change assistance device 1.
Figure 3:
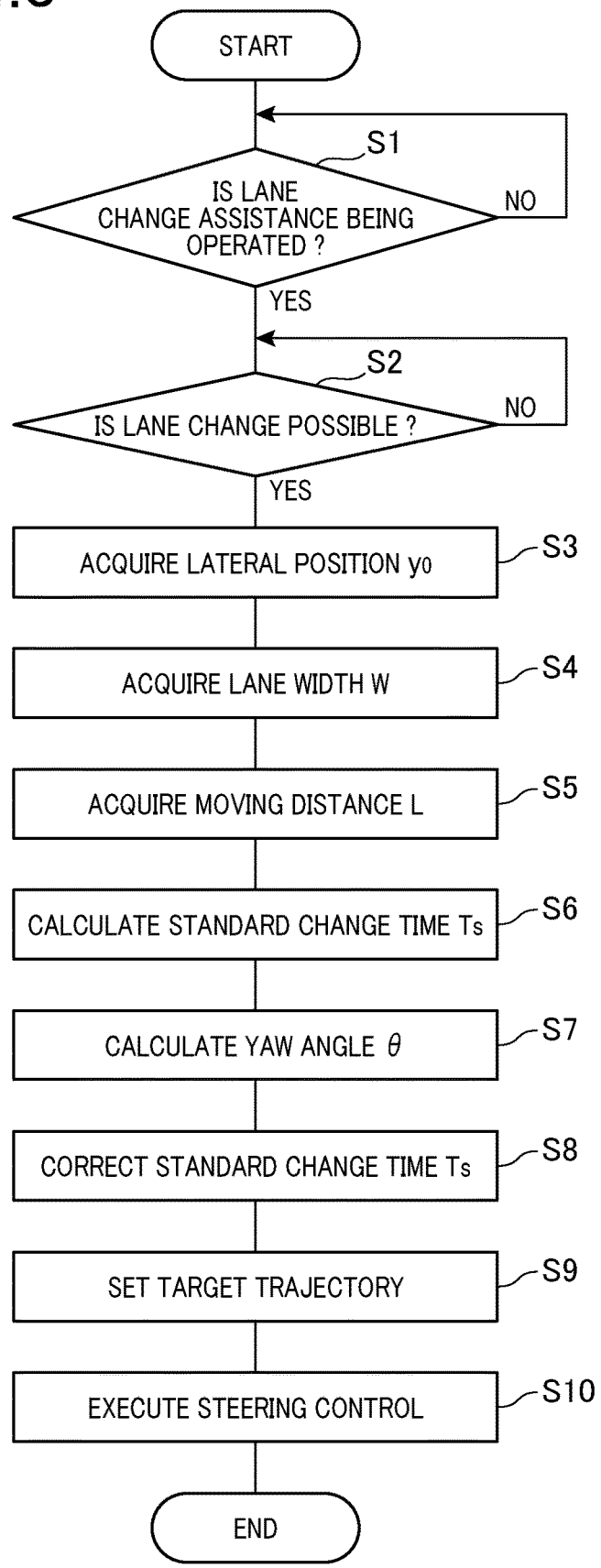
FIG. 3 is a flow chart illustrating a process executed by the lane change assistance device 1.

As shown in FIG. 2, the lane change assistance device 1 accomplishes a functional configuration (that is, a unit) in such a manner that the CPU 3 reads out and executes the program stored in the memory 5. That is, as shown in FIG. 2, the lane change assistance device 1 is provided with a determination unit 7, a change time setting unit 9, a yaw angle acquisition unit 11, a lateral position acquisition unit 13, a lane width acquisition unit 15, a steering control unit 17, and a moving distance acquisition unit 19 as functional units. The change time setting unit 9 is provided with a calculation unit 21 and a correction unit 23. A method for achieving the aforementioned components, with which the lane change assistance device 1 is configured, is not limited to software, and a part or all of the components may be achieved by using hardware in which a logic circuit, an analog circuit, and the like are combined with each other.

As shown in FIG. 1, the own vehicle is provided with a periphery monitoring system 25, a locator system 27, a power train system 29, a brake system 31, a steering system 33, an HMI system 34, a body system 35, and a wireless communication system 37 as well as the lane change assistance device 1. An HMI is an abbreviation of a human machine interface.

The periphery monitoring system 25 includes a camera 41 and other well-known sensors. The camera 41 takes a picture of a front side of the own vehicle, based on which image data are generated. A road in front of the own vehicle is included in an imaging range of the camera 41. The camera 41 is fixed to the own vehicle. The relation between an imaging direction of the camera 41 and a traveling direction of the own vehicle is constant. The periphery monitoring system 25 transmits the image data generated by the camera 41 and detection results of other sensors to the lane change assistance device 1.

The locator system 27 includes a GPS and a storage device storing map information. The locator system 27 has a function of acquiring position information of the own vehicle. The locator system 27 transmits the position information of the own vehicle to the lane change assistance device 1.

The power train system 29 has a function of controlling a power train of the own vehicle. The brake system 31 has a function of executing brake operation of the own vehicle. Further, the brake system 31 is provided with a wheel speed sensor 32. The wheel speed sensor 32 detects a rotational speed in a wheel of the own vehicle as a signal. The brake system 31 transmits a detection signal of the wheel speed sensor 32 to the lane change assistance device 1. The lane change assistance device 1 can calculate a speed of the own vehicle by using the detection signal of the wheel speed sensor 32. The steering system 33 has a function of steering the own vehicle.

The HMI system 34 receives operations from a driver of the own vehicle. The HMI system 34 provides various kinds of information about the own vehicle to the driver of the own vehicle. The body system 35 has various functions such as a door lock control, a light control, a lighting control of direction indicator lamps, a direction indicator lamp state notification, and the like of the own vehicle. The wireless communication system 37 has a function of executing vehicle-to-vehicle communication and communication between infrastructures.

The lane change assistance device 1, the periphery monitoring system 25, the locator system 27, the power train system 29, the brake system 31, the steering system 33, the HMI system 34, the body system 35, and the wireless communication system 37, (all of which are hereinafter referred to as each component), are connected to each other by a wireless LAN 39. Each component can transmit and receive information via the wireless LAN 39.

2. Process Executed by the Lane Change Assistance Device 1

Figure 4:
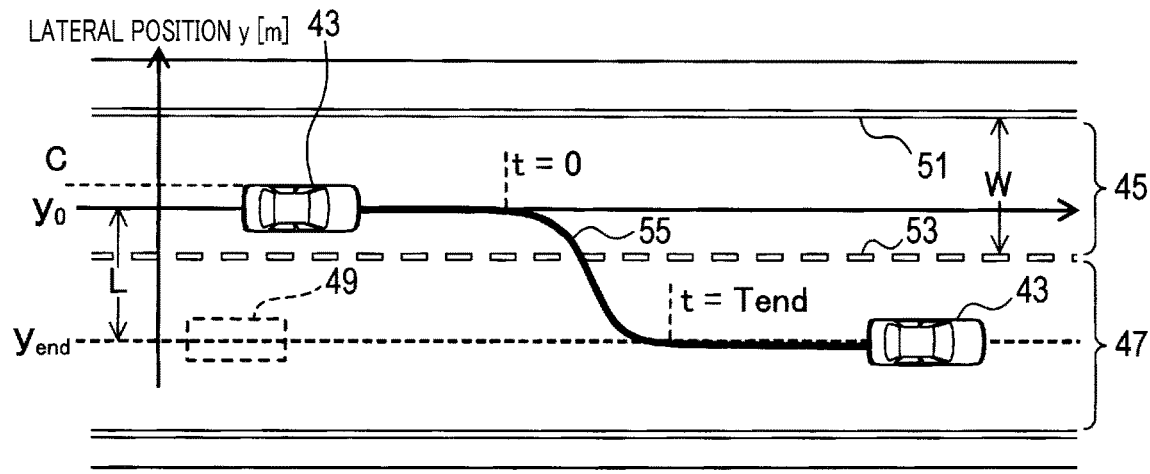
FIG. 4 is a drawing illustrating a parameter of a lane change.

A process executed by the lane change assistance device 1 will now be described with reference to FIGS. 3 to 7. The determination unit 7 determines whether or not the own vehicle is in the process of executing lane change assistance at step 1 in FIG. 3. A state in which the lane change assistance is in process of being executed means a state of executing a lane change when affirmative judgement is made at step 2, which will be described later. The lane change means that the own vehicle 43 moves from a currently travelling lane 45 to a neighboring lane 47 as shown in FIG. 4. The neighboring lane 47 corresponds to a new lane to which the running lane is changed (that is, a target lane to which the running lane is to be changed) desired during the lane change.

When the driver of the own vehicle 43 performs an operation corresponding to the execution of the lane change assistance in the HMI system 34, the determination unit 7 determines that the lane change assistance is in process of being executed. On the other hand, when the driver of the own vehicle does not perform the operation, the determination unit 7 determines that lane change assistance is not in the process of being executed. When the lane change assistance is in process of being executed, the process proceeds to step 2, and when the lane change assistance is not in process of being executed, the process returns to step 1.

The determination unit 7 determines whether or not the lane change can be executed, as described hereinafter at step 2. The determination unit 7 first acquires a relative position of the other vehicle 49 travelling on the neighboring lane 47 with respect to the own vehicle 43 and a relative speed thereof with respect to the own vehicle 43 by using the periphery monitoring system 25. Then, the determination unit 7 determines whether or not the own vehicle 43 would collide with the other vehicle 49 when the own vehicle 43 executes the lane change based upon the acquired relative position and relative speed of the other vehicle 49.

When it is determined that the own vehicle 43 will not collide with the other vehicle 49, the determination unit 7 determines that the lane change is possible. On the other hand, when it is determined that the own vehicle 43 and the other vehicle 49 would collide with each other, the determination unit 7 determines that the lane change is not possible.

When it is determined that the lane change is possible, the process proceeds to step 3, and when it is determined that the lane change is not possible, the process returns to step 2. The lateral position acquisition unit 13 acquires a lateral position $y_0$, as described hereinafter, at step 3. The lateral position $y_0$ is a lateral position of the own vehicle right before starting the lane change. Further, the lateral position is a position in a lateral direction. The lateral direction is a direction orthogonal to traveling directions of the lanes 45 and 47.

A line that passes through a center in the lateral direction of the lane 45 and extends along the travelling direction of the lane 45 is defined as a center line C. The center line C corresponds to a reference position. When the own vehicle 43 is on the center line C, the lateral position $y_0$ is 0. When the own vehicle is viewed from the neighboring lane 47 and the own vehicle 43 is farther than the center line C, the lateral position $y_0$ has a positive (+) value. When the own vehicle is viewed from the neighboring lane 47 and the own vehicle 43 is closer than the center line C, the lateral position y0 has a negative (−) value.

The lateral position acquisition unit 13 acquires a captured image of the region (hereinafter referred to as the image) in front of the own vehicle 43 by using the camera 41. The image includes lane boundary lines 51 and 53 that partition the lane 45. Positions in horizontal directions of the lane boundary lines 51 and 53 in the image and a lateral position $y_0$ have correlation with each other.

That is, when the lateral position $y_0$ has a positive (+) value, the own vehicle 43 is positioned at a side higher than the center line C in FIG. 4. At this time, positions in the horizontal directions of the lane boundary lines 51 and 53 in the image are deviated to a right side more than when the own vehicle 43 is positioned on the center line C. With respect to magnitude of the deviation, as an absolute value of the lateral position $y_0$ is greater, the magnitude of the deviation is greater.

Further, when the lateral position $y_0$ has the negative (−) value, the own vehicle 43 is positioned at a side lower than the center line C in FIG. 4. At this time, the positions in the horizontal directions of the lane boundary lines 51 and 53 in the image are deviated to a left side more than when the own vehicle 43 is positioned on the center line C. With respect to the magnitude of the deviation, as the absolute value of the lateral position $y_0$ is greater, the magnitude of the deviation is greater.

The lateral position acquisition unit 13 is provided with a map by which a relation between the positions in the horizontal directions of the lane boundary lines 51 and 53 in the image and the lateral position $y_0$ is defined in advance. The lateral position acquisition unit 13 acquires the lateral position $y_0$ by inputting the positions in the horizontal directions of the lane boundary lines 51 and 53 in the image to the map.

The lane width acquisition unit 15 acquires a lane width W of the lane 45, as described hereinafter, at step 4. As shown in FIG. 4, the lane width W is a distance between lateral directions of the lane boundary lines 51 and 53. The lane width acquisition unit 15 acquires the image in the same manner as that of step 3. The image includes lane boundary lines 51 and 53. The lane width acquisition unit 15 calculates a gap, in the horizontal directions thereof, between the lane boundary lines 51 and 53 in the image.

The lane width acquisition unit 15 is provided with a map by which a relation between the gap in the horizontal directions of the lane boundary lines 51 and 53 in the image and the lane width W is defined. The moving distance acquisition unit 19 acquires the lane width W by inputting the gap in the horizontal directions of the lane boundary lines 51 and 53 in the image to the map.

At step 5, the moving distance acquisition unit 19 acquires a moving distance L by adding the lateral position $y_0$ acquired at step 3 and the lane width W acquired at step 4. As shown in FIG. 4, the moving distance L is a distance in the lateral direction between the lateral position $y_0$ and a lateral position $g_e$na of the own vehicle right after completing the lane change.

Further, when the lateral position $y_0$ is 0, the moving distance L is equal to the lane width W. When the lateral position $y_0$ is the positive (+) value, the moving distance L is greater than the lane width W. Additionally, when the lateral position $y_0$ has the negative (−) value, the moving distance L is lower than the lane width W.

Figure 5:
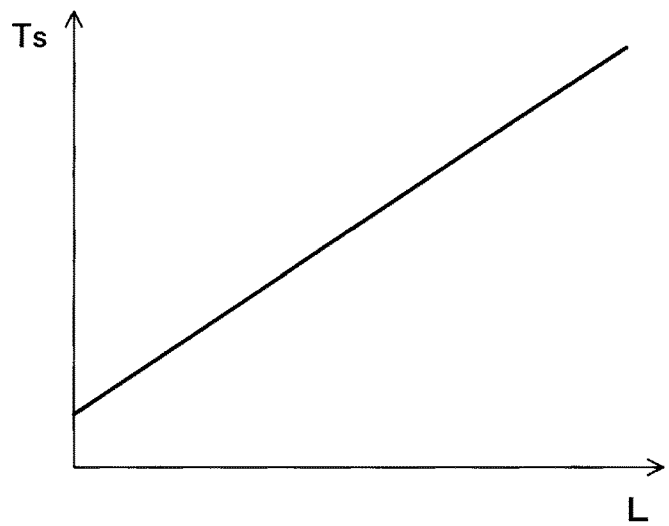
FIG. 5 is a graph illustrating a relationship between a moving distance L and a change time $T_s$.

The calculation unit 21 of the change time setting unit 9 calculates a standard change time $T_s$, as described hereinafter, at step 6. The calculation unit 21 is provided with a map by which a relation between the moving distance L and the change time $T_s$ is defined in advance. As shown in FIG. 5, the relation between the moving distance L and the change time $T_s$ defined by the map is a relation in which as the moving distance L is greater, the change time $T_s$ is longer. The calculation unit 21 acquires the change time $T_s$ by inputting the moving distance L acquired at step 5 to the map. That is, the change time setting unit 9 is configured to set a change time required for the lane change.

Figure 6:
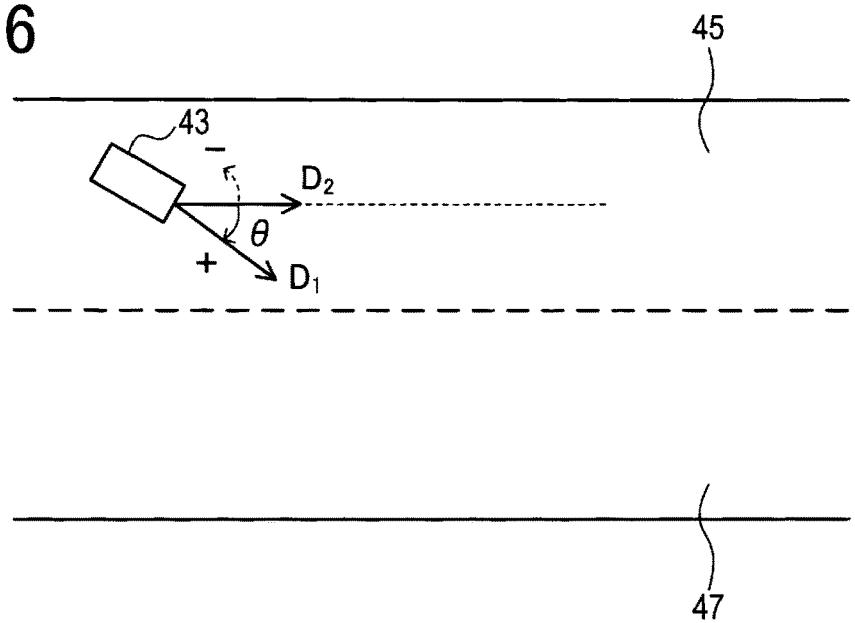
FIG. 6 is a drawing illustrating a yaw angle θ.

The yaw angle acquisition unit 11 acquires a yaw angle θ at step 7. As shown in FIG. 6, the yaw angle θ is an angle between a front direction D1 of the own vehicle 43 before starting the lane change, and a travelling direction D2 of the lane 45. As shown in FIG. 6, when the front direction D1 is a direction toward the neighboring lane 47, the yaw angle θ has a positive (+) value. When the front direction D1 is a direction away from the neighboring lane 47, the yaw angle θ has a negative (−) value.

The yaw angle θ having the positive (+) value corresponds to a yaw angle θ in which the own vehicle approaches the neighboring lane 47. The yaw angle θ having the negative (−) value corresponds to a yaw angle θ in which the own vehicle stays away from the neighboring lane 47. The yaw angle acquisition unit 11 acquires the yaw angle θ as described hereinafter. The yaw angle acquisition unit 11 acquires the image in the same manner as that of step 3. The image includes the lane boundary lines 51 and 53. The yaw angle acquisition unit 11 calculates longitudinal directions of the lane boundary lines 51 and 53 in the image. The longitudinal directions of the lane boundary lines 51 and 53 in the image and the yaw angle θ have a correlation. The yaw angle acquisition unit 11 is provided with a map by which the relation between the longitudinal directions of the lane boundary lines 51 and 53 in the image and the yaw angle θ is defined in advance. The yaw angle acquisition unit 11 acquires the yaw angle θ by inputting the longitudinal directions of the lane boundary lines 51 and 53 in the image to the map.

Figure 7:
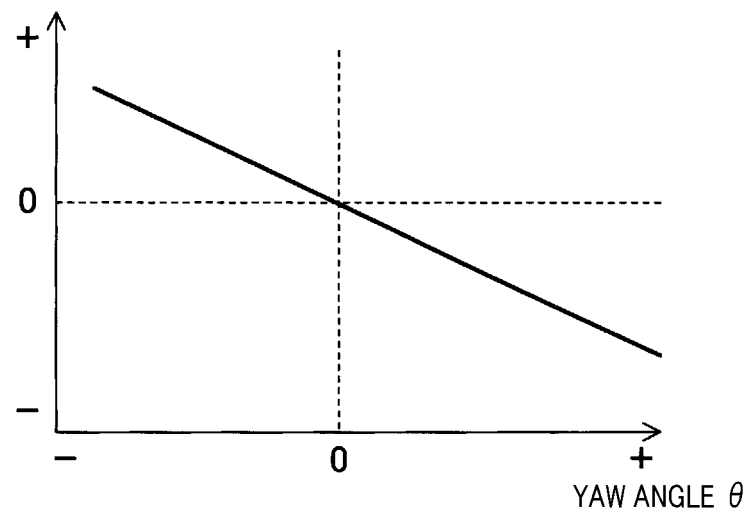
FIG. 7 is a graph illustrating a relationship between a yaw angle θ and a correction quantity ΔT.

The correction unit 23 sets a final change time $T_end$, as described hereinafter, at step 8. The correction unit 23 is provided with a map by which a relation between the yaw angle θ and a correction amount ΔT is defined in advance. As shown in FIG. 7, the relation between the yaw angle θ and the correction amount ΔT defined by the map is a relation in which the correction amount ΔT becomes 0 when the yaw angle θ is 0. Additionally, when the yaw angle θ has a positive (+) value, the correction amount ΔT has a negative (−) value, and as an absolute value of the yaw angle θ is greater, an absolute value of the correction amount ΔT is greater. Further, when the yaw angle θ has a negative (−) value, the correction amount ΔT has a positive (+) value, and as the absolute value of the yaw angle θ is greater, the absolute value of the correction amount ΔT is greater.

The correction unit 23 acquires the correction amount ΔT by inputting the yaw angle θ calculated at step 7 to the map. Next, the correction unit 23 sets a change time $T_end$ by adding the correction amount ΔT and the change time $T_s$ calculated at step 6.

When the yaw angle θ has a positive (+) value, the change time $T_end$ is shorter in comparison with a state where the yaw angle θ is equal to or less than 0°. Further, when the yaw angle θ has a negative (−) value, the change time $T_end$ is longer in comparison with a state where the yaw angle θ is more than 0°. When the yaw angle θ is 0°, the change time $T_end$ is equal to the change time $T_s$. Specifically, when the yaw angle θ acquired by the yaw angle acquisition unit 11 is a yaw angle in a state where the own vehicle approaches a target lane (that is, a new lane to which the running lane is to be changed) desired during the lane change, the change time setting unit 9 sets the change time shorter than in other states. Meanwhile, when the yaw angle θ acquired by the yaw angle acquisition unit 11 is a yaw angle in a state where the own vehicle stays away from the target lane, the change time setting unit 9 sets the change time longer than in other states.

When the yaw angle θ has a positive (+) value, the change time $T_{end}$ is shorter than the change time $T_s$. Additionally, when the yaw angle θ has a negative (−) value, the change time $T_{end}$ is extended from the change time $T_s$. That is, when the yaw angle θ acquired by the yaw angle acquisition unit 11 is the yaw angle in the state where the own vehicle approaches the target lane, the correction unit 23 shortens the change time calculated by the calculation unit 21. Meanwhile, when the yaw angle θ acquired by the yaw angle acquisition unit 11 is a yaw angle in the state where the own vehicle stays away from the target lane, the correction unit 23 extends the change time calculated by the calculation unit 21.

The steering control unit 17 sets a target trajectory 55 shown in FIG. 4 at step 9. The target trajectory 55 is a predicted travelling trajectory of the own vehicle 43 from a start of the lane change to an end thereof. The target trajectory 55 is a fifth-order time function with respect to the lateral position. Use of the fifth-order time function makes it possible that a steering angle of the own vehicle 43 from the start of the lane change to the end thereof is configured to be smaller in comparison with use of a first-order time function, whereby movement of the own vehicle 43 can be smoothly operated. The steering control unit 17 controls a steering unit of the own vehicle so as to execute the lane change in the change time set by the change time setting unit 9.

A target lateral position y(t) at time t defined by the target trajectory 55 is described by Equation (1). The time t is a time when the start time of the lane change is set to "0". The target lateral position y(t) is $y_0$ at a time point when the time t is "0", and is $y_{end}$ at a time point when the time t is $T_{end}$. That is, the time required for the own vehicle to travel along the target trajectory 55 is the change time $T_{end}$.

$$y(t)=(1/20)C_1(t^5/T_{end}^3)+(1/12)C_2(t^4/T_{end}^2)+(1/6)C_3(t^3/T_{end})+(1/2)C_4t^2+C_5t+C_6 \quad (1)$$

In Equation (1), C1, C2, and C3 are functions having $y_0$, $y_{end}$, $v_0$, $v_{end}$, $a_0$, $a_{end}$, and $T_{end}^3$ as variables. $v_0$ is a speed of the own vehicle 43 right before starting the lane change. $v_{end}$ is a speed of the own vehicle 43 right after finishing the lane change. $a_0$ is acceleration of the own vehicle 43 right before starting the lane change. $a_{end}$ is acceleration of the own vehicle 43 right after finishing the lane change. Further, C4 is $a_0$, $C_5$ is $v_0$, and $C_6$ is $y_0$.

The steering control unit 17 controls the power train system 29, the brake system 31, and the steering system 33, based on which the own vehicle can travel along the target trajectory 55 at step 10. The traveling of the own vehicle along the target trajectory 55 means the execution of the lane change requiring the change time $T_{end}$.

3. Effects of Lane Change Assistance Device 1

(1A) In the case in which the change time $T_{end}$ is constant regardless of the yaw angle θ, when the yaw angle θ has a positive (+) value, the steering angle and the yaw rate during the lane change become excessively small. Further, when the yaw angle θ has a negative (−) value, the steering angle and the yaw rate during the lane change may become excessively large, such that the driver of the own vehicle may have an unpleasant feeling.

When the yaw angle θ has a positive (+) value, the change time setting unit 9 of the lane change assistance device 1 sets the change time $T_end$ shorter in comparison with the state where the yaw angle θ is equal to or less than 0°. Further, when the yaw angle θ has a negative (−) value, the change time setting unit 9 of the lane change assistance device 1 sets the change time $T_{end}$ longer in comparison with the state where the yaw angle θ is more than 0°.

Accordingly, even when the yaw angle θ has a positive (+) value or a negative (−) value, the steering angle and the yaw rate during the lane change can be prevented from being excessively large or excessively small. As a result, it is advantageously possible to prevent the driver of the own vehicle from feeling discomfort.

Figure 8:
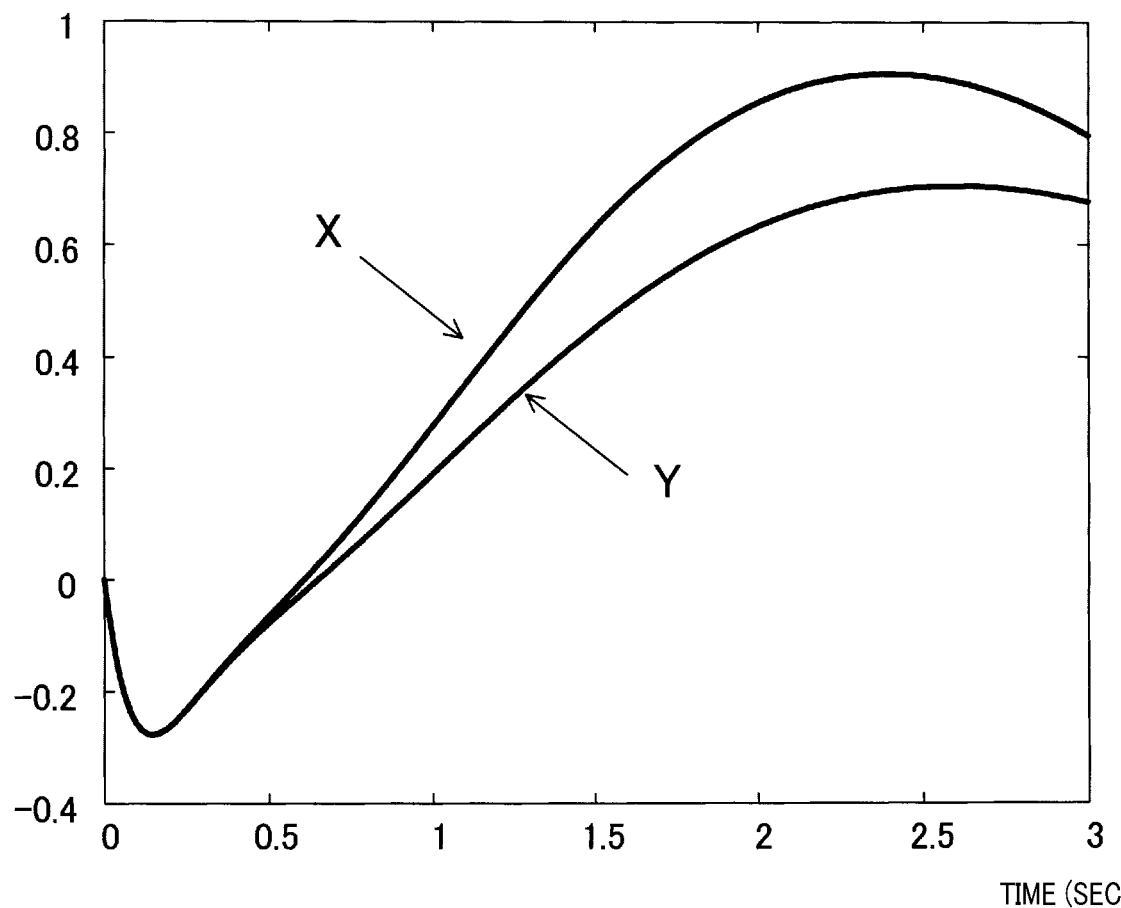
FIG. 8 is a graph illustrating a change of a yaw rate while changing a lane.

The aforementioned effect will now be described according to the simulation. As shown in FIG. 8, a change of the yaw rate of the own vehicle 43 is illustrated when the lane change is executed on the following conditions X and Y. The condition X is a condition in which the target trajectory 55 is set at step 9 so as to finish the lane change in the change time $T_s$ calculated at step 6 when the yaw angle θ has a negative (−) value. A value of the change time $T_s$ is 7 seconds.

The condition Y is a condition in which the target trajectory 55 is set at step 9 so as to finish the lane change in the change time $T_end$ set at step 8 when the yaw angle θ has the same negative (−) value as the condition X. A value of the change time $T_{end}$ is extended for 3 seconds in comparison with the change time $T_s$, thereby becoming 10 seconds. As shown in FIG. 8, under the condition Y, the yaw rate during the lane change does not become excessively large in comparison with the condition X, based on which the aforementioned effect can be confirmed in consideration of a result of the simulation.

(1B) In the case in which the change time $T_end$ is constant regardless of the moving distance L, when the moving distance L is smaller than the lane width W, the steering angle and the yaw rate during the lane change become excessively small. Further, when the moving distance L is greater than the lane width W, the steering angle and the yaw rate during the lane change become excessively large, such that the driver of the own vehicle may have the unpleasant feeling.

As the moving distance L is greater, the lane change assistance device 1 is configured to set the change time $T_s$ longer. Therefore, when the condition with respect to the yaw angle θ is the same, the lane change assistance device 1 sets the change time $T_{end}$ longer as the moving distance L is greater.

Accordingly, even when the moving distance L is smaller than the lane width W or greater than the lane width W, the steering angle and the yaw rate during the lane change can be prevented from being excessively large or excessively small. As a result, it is advantageously possible to prevent the driver of the own vehicle from feeling unpleasant.

(1C) The calculation unit 21 of the lane change assistance device 1 is configured to set the change time $T_s$ longer as the moving distance L is greater. Further, the correction unit 23 of the lane change assistance device 1 corrects the change time $T_s$ depending on the yaw angle θ. Specifically, the lane change assistance device 1 shortens the change time $T_s$ and sets the change time $T_{end}$ when the yaw angle θ has a positive (+) value. When the yaw angle θ has a negative (−) value, the lane change assistance device 1 extends the change time $T_s$ and sets the change time $T_{end}$.

Accordingly, the lane change assistance device 1 can set the change time $T_{end}$ corresponding to both the moving distance L and the yaw angle θ.

(1D) In the case in which the change time $T_end$ is constant regardless of the lateral position $y_0$, when the lateral position $y_0$ has a negative (−) value, the steering angle and yaw rate during lane change become excessively small. On the other hand, in the case in which the change time $T_end$ is constant regardless of the lateral position $y_0$, when the lateral position $y_0$ has a positive (+) value, the steering angle and yaw rate during the lane change become excessively large, such that the driver of the own vehicle may feel discomfort.

When the lateral position $y_0$ has a negative (−) value, the change time setting unit 9 of the lane change assistance device 1 sets the change time $T_s$ shorter in comparison with a state where the lateral position $y_0$ has a value greater than "0". Further, when the lateral position $y_0$ has a positive (+) value, the lane change assistance device 1 sets the change time $T_s$ longer in comparison with a state where the lateral position $y_0$ has a value equal to or lower than "0". Specifically, when the position in the lateral direction acquired by the lateral position acquisition unit 13 is closer to a target new lane (that is, a desired new lane to which the current running lane is to be changed) desired during the lane change than the reference position set in advance, the change time setting unit 9 sets the change time shorter than in other states. Further, when the position in the lateral direction acquired by the lateral position acquisition unit 13 is farther from the target lane than the reference position, the change time setting unit 9 sets the change time longer in than other states.

Therefore, in the case in which the condition with respect to the yaw angle θ is the same, when the lateral position $y_0$ has a negative (−) value, the lane change assistance device 1 sets the change time $T_{end}$ shorter in comparison with the state where the lateral position $y_0$ has the value greater than "0". On the other hand, in the case in which the condition with respect to the yaw angle θ is the same, when the lateral position $y_0$ has a positive (+) value, the lane change assistance device 1 sets the change time $T_end$ longer in comparison with the state where the lateral position $y_0$ has the value equal to or lower than "0".

Accordingly, even when the lateral position $y_0$ has a positive (+) value or a negative (−) value, the steering angle and the yaw rate during the lane change can be prevented from becoming excessively large or small. As a result, it is advantageously possible to prevent the driver of the own vehicle from feeling discomfort.

Other Exemplary Embodiments

As described above, while the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scoop of the appended claims.

(1) In the case of the lane change assistance device 1, when the absolute value of the yaw angle θ is equal to or less than a threshold value set in advance, the change time $T_s$ may be set as the change time $T_end$ as it is. That is, when a size of the yaw angle θ acquired by the yaw angle acquisition unit 11 is equal to or less than the threshold value set in advance, the change time setting unit 9 may set the change time calculated by the calculation unit 21. In this case, it is advantageously possible to reduce a processing load of the lane change assistance device 1.

(2) The lane change assistance device 1 may set the change time $T_s$ depending on the lane width W. In this case, for example, the change time $T_s$ may be a value that is not influenced by the lateral position $y_0$. In this case, it is advantageously possible to reduce the processing load of the lane change assistance device 1.

(3) The lane change assistance device 1 may use the change time $T_s$ as the change time $T_{end}$ as it is. In this case, it is advantageously possible to reduce the processing load of the lane change assistance device 1.

(4) The lane change assistance device 1 may acquire the yaw angle θ by other methods. For example, the yaw angle θ may be acquired from a history of detection results of the yaw rate sensor or the steering angle sensor, and the like.

(5) When the yaw angle θ is within a range set in advance, the lane change assistance device 1 performs the correction executed at step 8, but when the yaw angle θ is out of the range set in advance, the lane change assistance device 1 may not perform the correction executed at step 8. For example, when the yaw angle θ has a negative (−) value, the lane change assistance device 1 performs the correction executed at step 8, but when the yaw angle θ has a value greater than "0", the lane change assistance device 1 may not perform the correction executed at step 8. In this case, it is advantageously possible to reduce the processing load of the lane change assistance device 1.

(6) The lane change assistance device 1 may acquire the lane width W by other methods. For example, the lane width W may be acquired by reading the lane width W at a current position of the own vehicle from map information including a lane width at each position.

(7) A plurality of functions that one component has in the exemplary embodiment may be achieved by a plurality of components, or one function that one component has may be achieved by a plurality of components. Further, a plurality of functions that the plurality of components have may be achieved by one component, or one function achieved by the plurality of components may be achieved by one component. Further, a part of the configuration in the exemplary embodiment may be omitted. Additionally, at least a part of the configuration in the exemplary embodiment may be added to or be substituted for the configuration in the other exemplary embodiments. Further, exemplary embodiments of the present disclosure include technical ideas determined by the scope of the appended claims.

(8) In addition to the lane change assistance device, the present disclosure can be accomplished by various modifications such as a system including the lane change assistance device as a component, a program for performing a computer function as the lane change assistance device, a non-transitive substantive recording medium such as a semiconductor memory storing the program, a lane change assistance method, and the like.

While the present disclosure has been described in connection with what is presently considered to be practical exemplary embodiments, it is to be understood that the disclosure is not limited to the disclosed embodiments and configurations, but, on the contrary, it is intended to cover various modifications and equivalent arrangements included within the spirit and scope of the appended claims. Further, the spirit and scope of the present disclosure also includes various combinations and embodiments as well as other combinations and embodiments including only one element thereof, or more than thereof, or less than thereof.

PARTIAL DESCRIPTION OF SYMBOLS

1: lane change assistance device
9: change time setting unit
11: yaw angle acquisition unit
17: steering control unit

What is claimed is:

1. A lane change assistance device for assisting a lane change of a vehicle, comprising:
   a change time setting unit configured to set a change time required for the lane change;
   a yaw angle acquisition unit configured to acquire a yaw angle of the vehicle before starting the lane change; and
   a steering control unit configured to control a steering unit of the vehicle to perform the lane change from a present lane on which the vehicle is travelling to a target lane desired during the lane change, the change time set by the change time setting unit, wherein
   when performing the lane change from the present lane to the target lane and the yaw angle acquired by the yaw angle acquisition unit, shows a state in which the vehicle proceeds in a direction towards the target lane desired during the lane change and is moving away from the present lane, the change time setting unit is configured to set the change time to a first period of time that is shorter than a second period of time in which the yaw angle, acquired by the yaw angle acquisition unit, shows a state in which the vehicle proceeds in a direction towards the present lane and is moving away from the target lane.

2. The lane change assistance device according to claim 1, further comprising:
   a moving distance acquisition unit configured to acquire a moving distance in a lateral direction during the lane change, wherein the change time setting unit includes:
      a calculation unit configured to calculate the change time in such a manner that as the greater the moving distance acquired by the moving distance acquisition unit is, the longer the change time is; and
      a correction unit configured to correct the change time such that when the yaw angle acquired by the yaw angle acquisition unit is provided in a state where the vehicle proceeds in a direction towards the target lane desired during the lane change and is moving away from the present lane, the correction unit is configured to shorten the change time calculated by the calculation unit, and when the yaw angle, acquired by the yaw angle acquisition unit is provided in a state where the vehicle proceeds in a direction towards the present lane and is moving away from the target lane, the correction unit is configured to extend the change time calculated by the calculation unit.

3. The lane change assistance device according to claim 2, wherein when a size of the yaw angle acquired by the yaw angle acquisition unit is equal to or less than a threshold value set in advance, the change time setting unit sets the change time calculated by the calculation unit.

4. A lane change assistance device for assisting a lane change of a vehicle, comprising:
   a change time setting unit configured to set a change time required for the lane change;
   a lateral position acquisition unit configured to acquire a position in a lateral direction of the vehicle before starting the lane change; and
   a steering control unit configured to control a steering unit of the vehicle to perform the lane change from a present lane on which the vehicle is travelling to a target lane desired during the lane change, the change time set by the change time setting unit, wherein
   when performing the lane change from the present lane to the target lane and the position in the lateral direction acquired by the lateral position acquisition unit is closer to the target lane desired during the lane change than a reference position set in advance, the change time setting unit is configured to set the change time to a first period of time that is shorter than a second period of time in which the position in the lateral direction acquired by the lateral position acquisition unit is farther from the target lane than the reference position, and
   a moving distance acquisition unit configured to acquire a moving distance in the lateral direction during the lane change by using the position in the lateral direction acquired by the lateral position acquisition unit, wherein the change time setting unit is configured to set the change time in such a manner that the greater the moving distance acquired by the moving distance acquisition unit is, the longer the change time is.

5. A lane change assistance method for assisting a lane change of a vehicle, comprising the steps of:
   setting a change time in which a change time required for the lane change is set;
   acquiring a yaw angle in which a yaw angle of the vehicle before starting the lane change is acquired; and controlling steering in which a steering unit of the vehicle is controlled to perform the lane change, from a present lane on which the vehicle is travelling to a target lane desired during the lane change, in the change time set by the step of setting the change time, wherein in response to performing the lane change from the present lane to the target lane and the yaw angle acquired by the step of acquiring a yaw rate angle being provided in a state where the vehicle proceeds in a direction towards the target lane desired during the lane change and moving away from the present lane, the step of setting the change time sets the change time to a first period of time that is shorter than a second period of time in which the yaw angle acquired by the step of acquiring a yaw rate angle is provided in a state where the vehicle proceeds in a direction towards the present lane and away from the target lane.

6. The lane change assistance method according to claim 5, further comprising the step of:

acquiring a moving distance in which a moving distance in a lateral direction during the lane change is acquired, wherein the step of setting the change time includes the steps of: calculation in which as the moving distance acquired by the step of acquiring the moving distance is greater, the change time is calculated to be longer; and correction in which when the yaw angle acquired by the step of acquiring the yaw angle is a yaw angle in a state where the vehicle approaches the target lane, the change time calculated by the step of calculation is shortened, and when the yaw angle acquired by the step of acquiring the yaw angle a yaw angle in a state where the vehicle stays away from the target lane, the change time calculated by the step of calculation is extended.

7. A lane change assistance method for assisting a lane change of a vehicle, comprising the steps of:

setting a change time in which a change time required for the lane change is set;

acquiring a lateral position in which a position in a lateral direction of the vehicle before starting the lane change is acquired; and controlling steering in which a steering unit of the vehicle is controlled to perform the lane change from a present lane on which the vehicle is travelling to a target lane desired during the lane change, in the change time set by the step of setting the change time, wherein in response to the lane change from the present lane to the target lane being performed and the position in the lateral direction acquired by step of acquiring the lateral position being closer to the target lane desired during the lane change than a reference position set in advance, the change time is set to a first period of time which is shorter than a second period of time in which the position in the lateral direction acquired by step of acquiring the lateral position is farther from the target lane than a reference position, and acquiring a moving distance in which a moving distance in the lateral direction during the lane change is acquired by using the position in the lateral direction acquired by the step of acquiring the lateral position, wherein as the moving distance acquired by the step of acquiring the moving distance is greater, the change time is set to be longer by the step of setting the change time.

8. A lane change assistance device for assisting a lane change of a vehicle, comprising:

a periphery monitoring sensor configured to obtain a running state of the vehicle;

a locator system configured to acquire position information of the vehicle; and a control system, including a computer hardware processor for executing instructions, the instructions enabling the control system to:

set a time variably in accordance with a running state of the vehicle, the time is required for the lane change of the vehicle from a present lane on which the vehicle is travelling to a target lane desired during the lane change;

acquire a yaw angle of the vehicle before starting the lane change;

calculate a standard change time based on a relation between a moving distance of the vehicle and the standard change time being preset in advance; and control a steering of the vehicle to perform the lane change, from the present lane on which the vehicle is travelling to the target lane desired during the lane change, in the time of the lane change, wherein when performing the lane change from the present lane to the target lane and the yaw angle acquired is provided in a state where the vehicle proceeds in a direction towards the target lane desired during the lane change and is moving away from the present lane, the time is set to a first period of time which is shorter than a second period of time in which the yaw angle acquired is provided in a state where the vehicle proceeds in a direction towards the present lane and is moving away from the target lane.

9. The lane change assistance device for assisting a lane change of a vehicle, according to claim 1, comprising a calculation unit configured to calculate a standard change time based on a map, wherein the map is a relation between a moving distance of the vehicle and the change time.

* * * * *